United States Patent
Gummadi et al.

(10) Patent No.: US 11,956,687 B2
(45) Date of Patent: Apr. 9, 2024

(54) UE RETURN AFTER CALL CONTINUITY PROCEDURE

(71) Applicant: QUALCOMM Incorporated, San Diego, CA (US)

(72) Inventors: Bapineedu Chowdary Gummadi, Hyderabad (IN); Lingaiah Anugula, Hyderabad (IN); Srikanth Reddy Dolu Surabhi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/501,540

(22) Filed: Oct. 14, 2021

(65) Prior Publication Data

US 2023/0119943 A1 Apr. 20, 2023

(51) Int. Cl.
*H04W 36/18* (2009.01)
*H04W 8/18* (2009.01)
*H04W 36/14* (2009.01)
*H04W 48/16* (2009.01)

(52) U.S. Cl.
CPC .......... *H04W 36/18* (2013.01); *H04W 8/183* (2013.01); *H04W 36/14* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2017/0026985 A1* | 1/2017 | Lindoff | H04L 1/0015 |
| 2018/0132289 A1* | 5/2018 | Zhao | H04W 76/16 |
| 2018/0234878 A1* | 8/2018 | Anand | H04W 28/0289 |
| 2020/0084814 A1* | 3/2020 | Lindoff | H04W 64/00 |
| 2021/0029594 A1* | 1/2021 | Kunz | H04W 36/0066 |
| 2021/0076264 A1 | 3/2021 | Zhang et al. | |
| 2021/0120461 A1* | 4/2021 | Chong | H04W 36/0033 |
| 2021/0211944 A1* | 7/2021 | Eklöf | H04W 76/30 |
| 2021/0345185 A1* | 11/2021 | Kodali | H04W 36/0072 |
| 2022/0132294 A1* | 4/2022 | Shah | H04W 8/02 |
| 2022/0141719 A1* | 5/2022 | Shan | H04W 36/0055 370/331 |

(Continued)

FOREIGN PATENT DOCUMENTS

WO WO-2019227278 A1 * 12/2019

OTHER PUBLICATIONS

Ericsson: "Return from UTRAN to NG-RAN for SRVCC from 5GS to UTRAN", R6-180146—Disc on NR SRVCC, 3GPP TSG RAN WG6#9, 3rd Generation Partnership Project, Mobile Competence Centre, 650, Route Des Lucioles, F-06921 Sophia-Antipolis Cedex, France, vol. RAN WG6, No. Gothenburg, Sweden, Aug. 20, 2018-Aug. 24, 2018, Aug. 14, 2018, 4 Pages, XP051589608, 1 Introduction, 2.1.1.2 10.3.7.25 Inter-RAT info, 2.2 possible updates, Proposal 2.

(Continued)

*Primary Examiner* — German Viana Di Prisco
(74) *Attorney, Agent, or Firm* — QUALCOMM Incorporated

(57) ABSTRACT

Certain aspects of the present disclosure provide a technique for wireless communications by a user equipment (UE). The UE moves from a first radio access technology (RAT) to a second RAT to maintain continuity of a call and takes one or more actions involving a third RAT to speed a return to the first RAT after the call has ended in the second RAT.

26 Claims, 9 Drawing Sheets

(56) References Cited

U.S. PATENT DOCUMENTS

2023/0156530 A1\* 5/2023 Jeong .................. H04W 72/56
370/331

OTHER PUBLICATIONS

Intel: "New Solution on Returning UE from UTRAN to NG-RAN or E-UTRAN", S2-185172_(WAS3303) New_Solution_On_Returning_From_UtranV1, 3GPP TSG SA WG2 Meeting #127BIS, 3rd Generation Partnership Project, Mobile Competence Centre, 650, Route Des Lucioles, F-06921 Sophia-Antipolis Cedex, vol. SA WG2, No. Newport Beach, U.S., May 28, 2018-Jun. 1, 2018, May 22, 2018 (May 22, 2018), 3 Pages, XP051535697, Y.X.1.2 Returning JE to NR or E-UTRA.

International Search Report and Written Opinion—PCT/US2022/045015—ISA/EPO—dated Jan. 20, 2023.

VIVO: "How to Return to 5GS", SA WG2 Meeting #127-bis, S2-185610, 3rd Generation Partnership Project, Mobile Competence Centre, 650, Route Des Lucioles, F-06921 Sophia-Antipolis Cedex, France, vol. SA WG2, No. Newport Beach, USA, May 28, 2018-Jun. 1, 2018, Jun. 2, 2018, 4 Pages, XP051536085, 1 Discussion (scenario 1), 1 Discussion (scenario 2).

\* cited by examiner

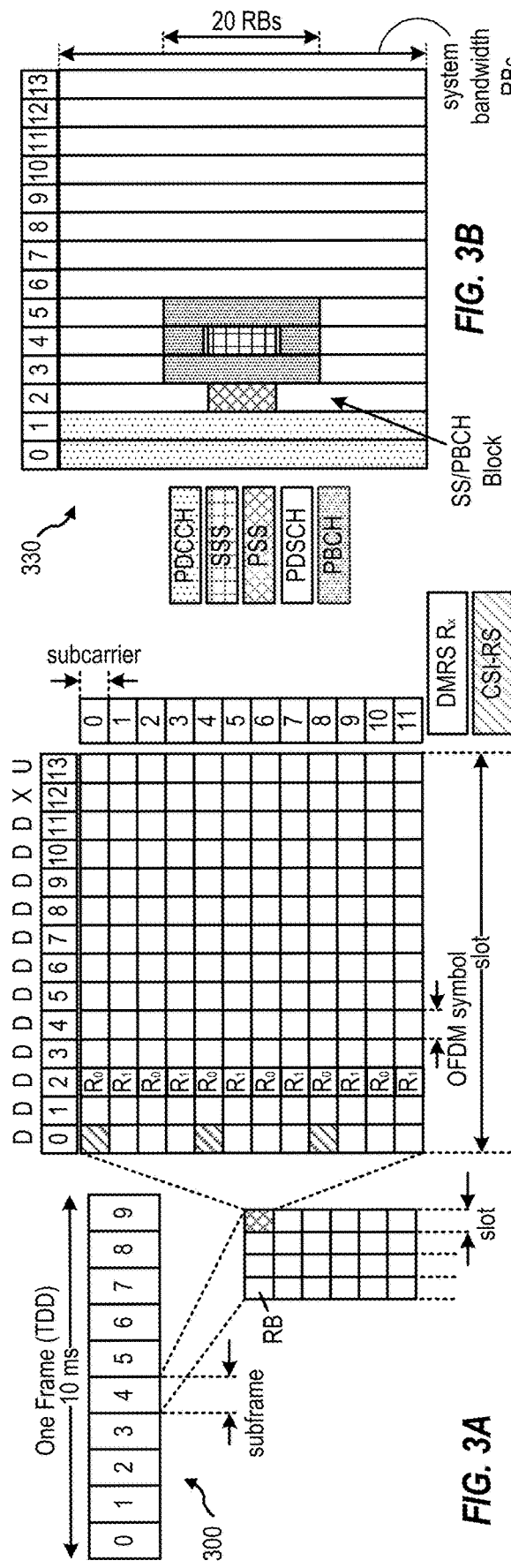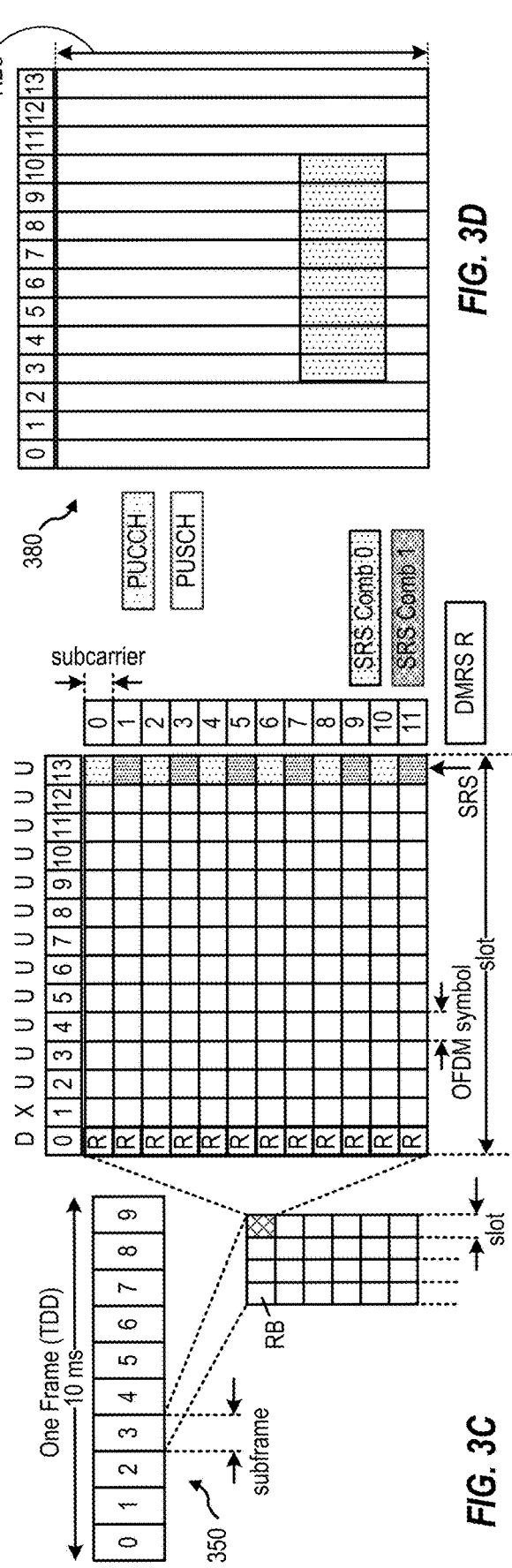

UE RETURN AFTER CALL CONTINUITY PROCEDURE

INTRODUCTION

Aspects of the present disclosure relate to wireless communications, and more particularly, to techniques for a user equipment (UE) to return to a first radio access technology (RAT) network after a call continuity procedure in a second RAT network.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance of UEs operating with one or more subscriber identity modules (SIMs).

One aspect provides a method for wireless communications by a user equipment (UE), including moving from a first radio access technology (RAT) to a second RAT to maintain continuity of a call and taking one or more actions involving a third RAT to speed a return to the first RAT after the call has ended in the second RAT.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide techniques for a user equipment (UE) to return to a first radio access technology (RAT) network after a call continuity procedure in a second RAT network. The techniques may be designed to speed return to the first RAT network (e.g., NR) after a single radio voice call continuity (SRVCC) procedure in a Universal Terrestrial Radio Access (UTRA) network.

SRVCC generally refers to a scheme that enables inter-RAT as well as a handover from packet data to circuit switched data voice calls. By enabling SRVCC, operators are able to make the handovers while maintaining existing quality of service, QoS and also ensuring that call continuity meets the critical requirements for emergency calls.

In contrast to SRVCC, other mechanisms require that a UE has two active radios to facilitate handover. This requirement adds circuit complexity and, to enable the two radios to be active simultaneously increases power consumption considerably. As the name implies, SRVCC requires only a single active radio in the UE.

SRVCC may be attractive to operators, for example, because there might be coverage holes where coverage in enhanced networks (e.g., LTE/NR) are poor and handover to UTRA may help maintain continuity of a call. Since UTRA is a legacy RAT, however, redirection from UTRA to NR may not be provisioned. Also, system information blocks (SIBs) broadcast in UTRA will not carry NR cell information. As a result, there is no clear mechanism for a UE to return to NR directly from UTRA after an SRVCC procedure after a call has ended.

Aspects of the present disclosure, however, provide mechanisms that may help a UE perform a fast return to NR once the call has ended in UMTS. As a result, the mechanisms provided herein may lead to improved UE performance when a call ends after SRVCC in UTRA and better overall user experience.

Introduction to Wireless Communication Networks

Figure 1:
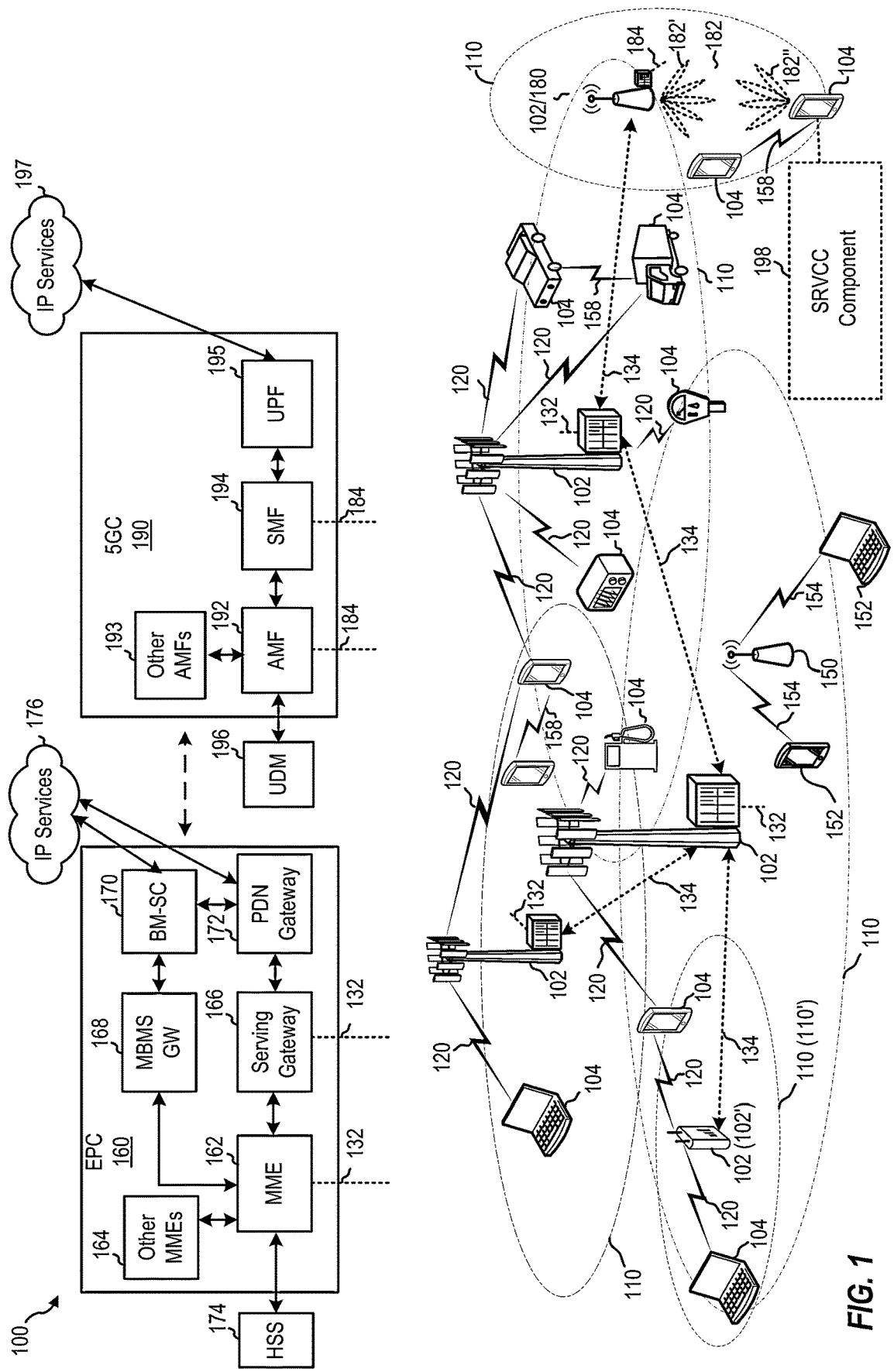
FIG. 1 is a block diagram conceptually illustrating an example wireless communication network.

FIG. 1 depicts an example of a wireless communications system 100, in which aspects described herein may be implemented.

Figure 8:
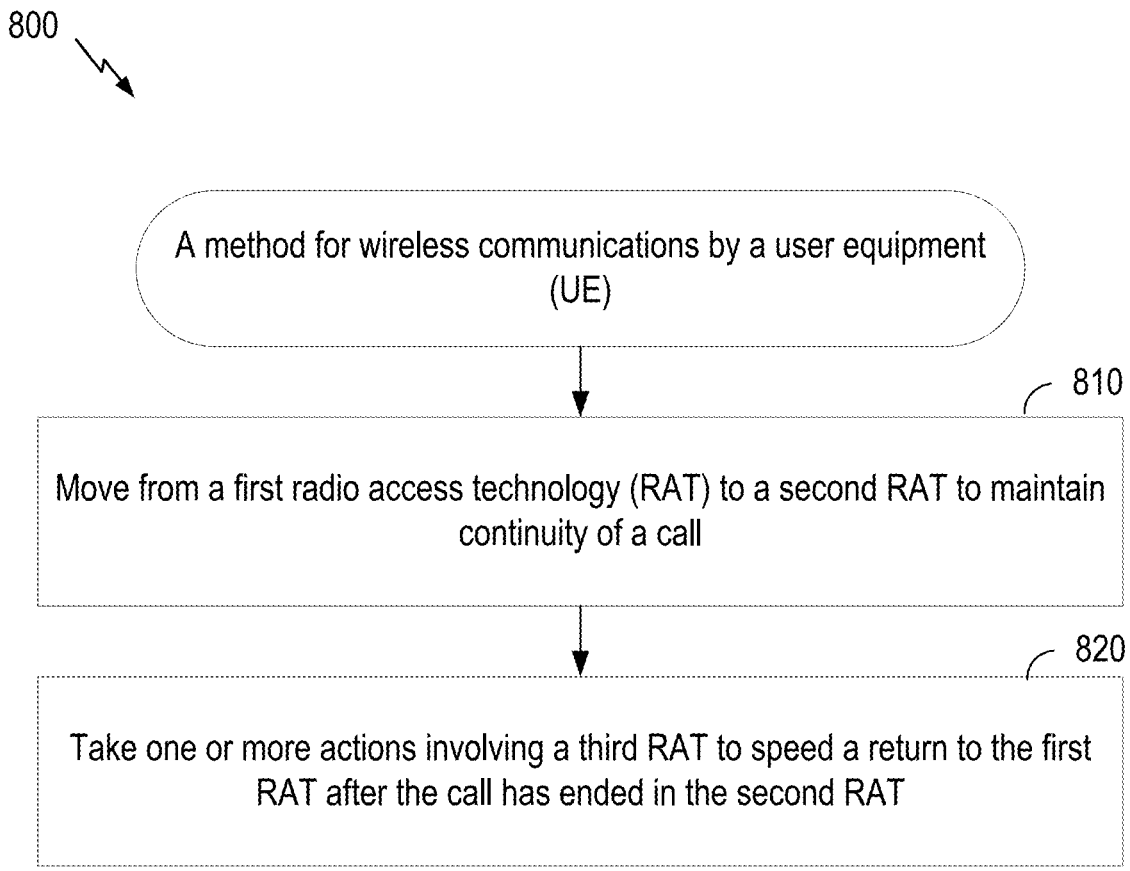
FIG. 8 depicts a flow diagram illustrating example operations for wireless communications by a UE, according to certain aspects of the present disclosure.

For example, wireless communication system 100 includes SRVCC component 198, which may be configured to perform, or cause a user equipment (UE) 104 to perform, operations 800 of FIG. 8.

Generally, wireless communications system 100 includes base stations (BSs) 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 2:
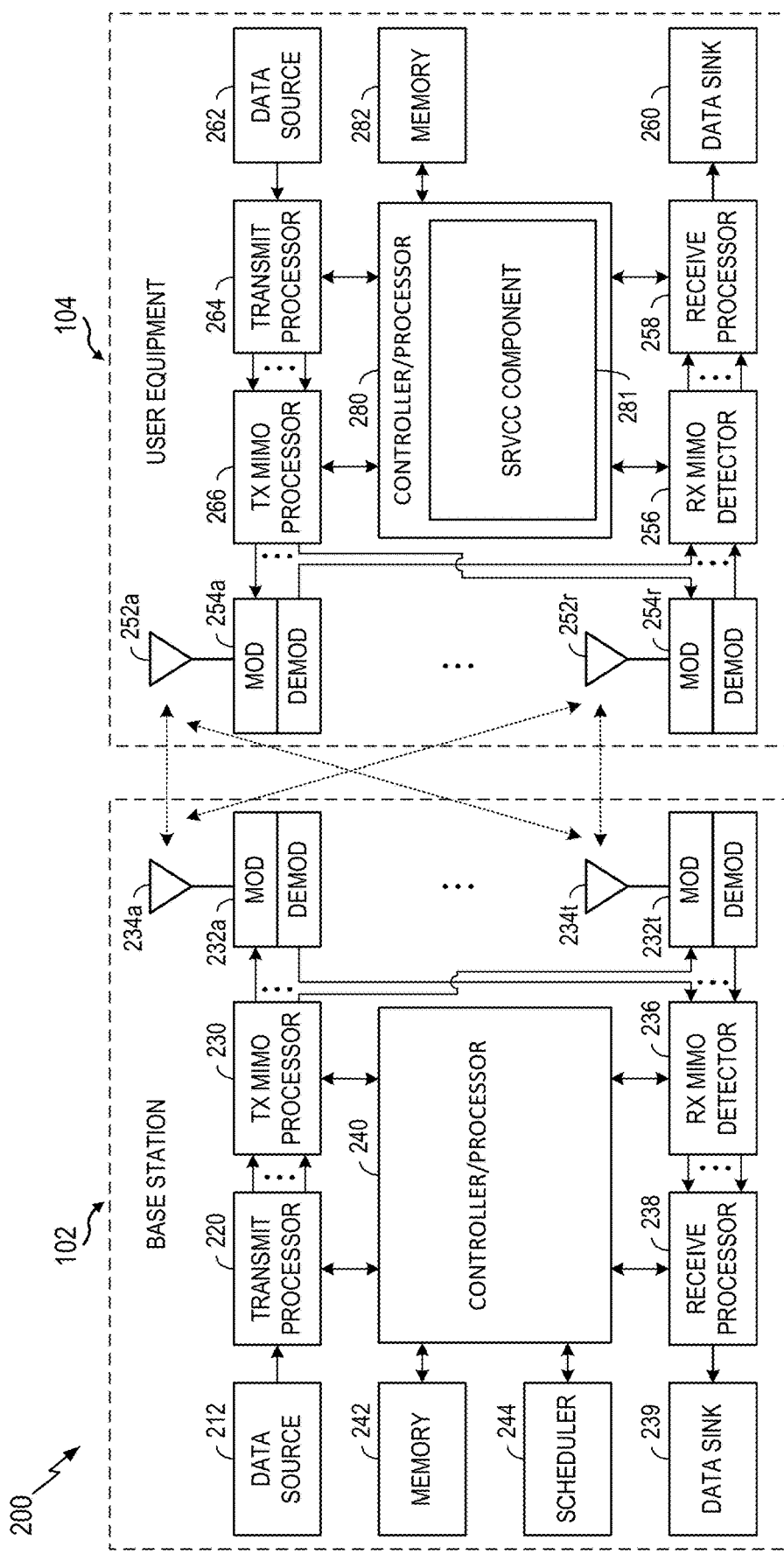
FIG. 2 is a block diagram conceptually illustrating aspects of an example base station (BS) and user equipment (UE).

FIG. 2 depicts aspects of an example base station (BS) 102 and a user equipment (UE) 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes SRVCC component 281, which may be representative of SRVCC component 198 of FIG. 1. Notably, while depicted as an aspect of controller/processor 280, SRVCC component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave BS 180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Example MSIM Operation

Figure 4:
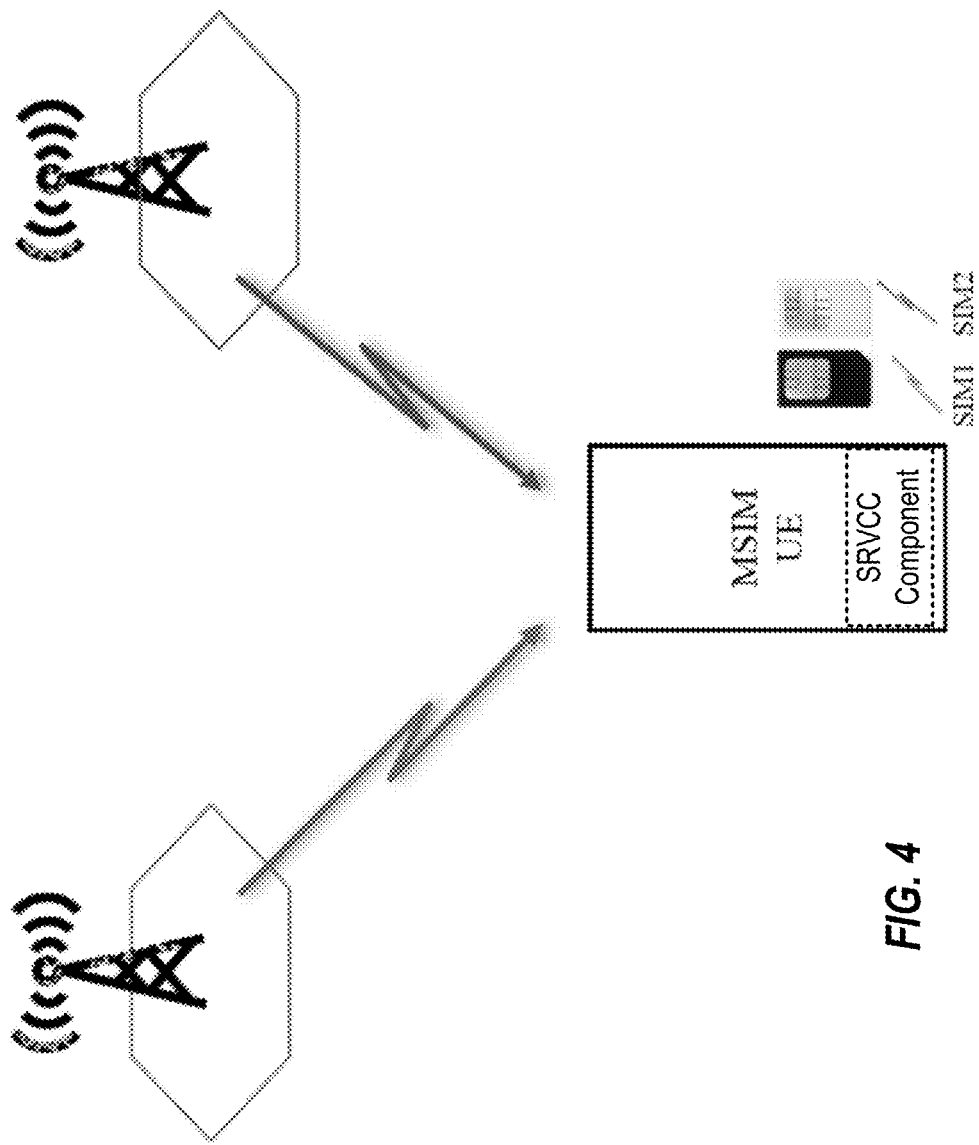
FIG. 4 depicts an example multi-SIM deployment for a UE, in accordance with certain aspects of the present disclosure.

FIG. 4 illustrates an example multi-SIM (MSIM) deployment, in which a UE supports multiple SIMs (SIM1 and SIM2), which may support the same or different radio access technologies (RATs). At any given time, the multiple SIMS may concurrently be in an idle state and may support different modes of operation. For example, a UE with a single receiver may support a Single Receive Dual SIM Dual Standby (SR-DSDS) mode, where only one RAT is received at a time. In a Dual Receive (DR)-DSDS mode, the MSIM UE may simultaneously multiple RATs at a time.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations like dual-SIM dual active (DSDA) or dual-SIM dual standby (DSDS). DSDS generally refers to a dual-SIM deployment where the two SIM cards of the UE may be unable to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMs to support a variety of different combination options. For example, dual-SIM (DSIM) devices could support the following:
SA-NR+SA-NR: both SIMs could support standalone (SA) NR (SA-NR);
NSA-NR+LTE: one SIM supports non-standalone (NSA) while another SIM supports LTE;
LTE+LTE: both SIMs support LTE;
LTE+W: one SIM supports LTE, the other supports wideband CDMA; or any other combination (X RAT+X RAT both SIMs the same RAT or X RAT+Y RAT the SIMs support different RATs).

In some cases, in a multi-SIM deployment, each SIM of the UE can belong to the same network carrier. For example, two or more SIMs (also referred to herein as subscribers or SUBs) belonging to the same operator can be in the following modes:
(1) Idle+Idle: 2 or more SUBs in Idle camp to the same cell
(2) Connected+Idle: 1 SUB in Idle and 1 Sub Connected camp to the same cell In conventional multi-SIM deployments, in scenarios where the UE is performing a low priority activity via a first SIM and another high priority activity is triggered on the same or different SIM of the UE, the high priority activity may be delayed, significantly impacting the performance of the UE. For example, assume an out of service indication is triggered on a SIM while another (or same) SIM is performing CSG autonomous search function. In this example, the recovery from the out of service may be delayed due to the CSG autonomous search, which may involve performing measurements for multiple CSG cells, performing a full band scan to obtain a given CSG cell, etc. These measurements and band scans may utilize RF resources of the UE, causing tune-aways and increasing the delay time for out of service recovery on the SIM in which the out of service indication is triggered on.

In some examples, in scenarios where a PS call/throughput is triggered on a SIM while another (or same) SIM is performing CSG autonomous search function, the triggered SIM may experience throughput degradation due to the CSG autonomous search function. In some examples, in scenarios where a SIM is not running throughput but the network sends measurement to the SIM for NR addition while another (or same) SIM is performing CSG autonomous search function, there may be a delay in NR measurements, additions/deletions/configurations, etc., in the triggered SIM, due to tune-aways triggered from the CSG autonomous search function. In some examples, in scenarios where a network is running a timer for a given NR configuration on a SIM and there is a delay on that configuration, the network may delete NR object(s) and deactivate NR from that SIM.

Example UE Return After Call Continuity Procedure

Aspects of the present disclosure provide techniques that may help speed a UE's return to a first RAT network (e.g., NR) after an SRVCC procedure in a second RAT (e.g., UTRA) network. The mechanisms provided herein may lead to improved UE performance when a call ends after SRVCC in UTRA and better overall user experience, particularly in areas where there may be coverage holes where LTE/NR are poor.

As noted above, since UTRA is a legacy RAT, redirection from UTRA to NR is typically not provisioned and UTRA SIBs will not carry NR cell information. Thus, there is no way for the UE to return to NR directly from UTRA, after an SRVCC call has ended.

Aspects of the present disclosure, however, provide various proposals that may speed a UE's return to NR, based on various scenarios for better performance of the device when call ends after SRVCC in UTRA. The various scenarios may include cases where the UE has a single SIM and when a UE has multiple SIMS.

As will be described in greater detail below, in certain scenarios, a UE may obtain information broadcast in one RAT about cells in one or more other RATs. For example, the UE may obtain information about NR from a system information block (SIB, such as SIB24) broadcast in LTE. As an alternative, or in addition, the UE may obtain information about LTE from SIB (e.g., SIB19) broadcast in UTRA.

Figure 5:
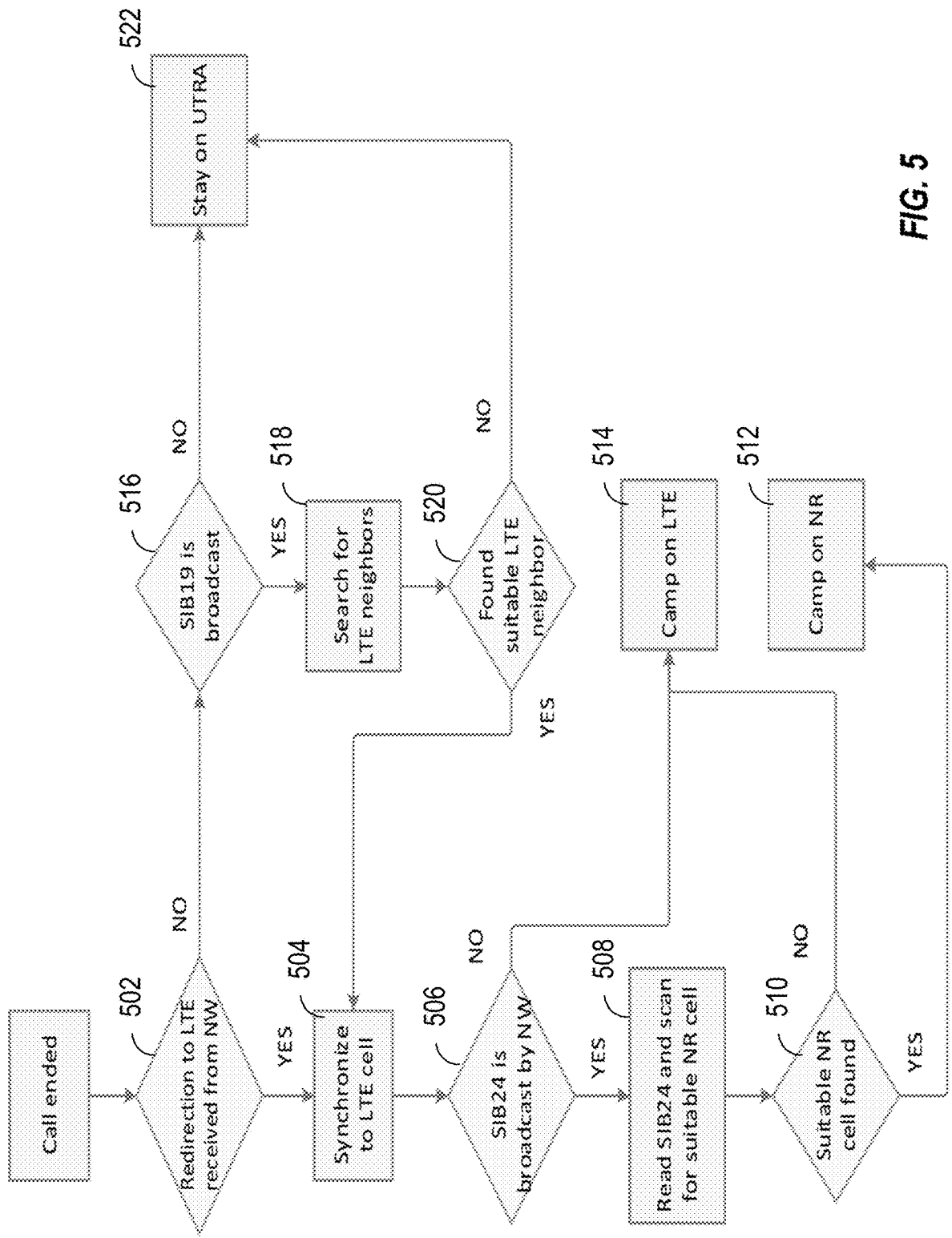
FIG. 5 depicts an example flow diagram for UE return to a first RAT after a call continuity procedure in a second RAT, in accordance with certain aspects of the present disclosure.

FIG. 5 illustrates a flow diagram for an example of such a procedure a UE may perform for a fast return from UTRA to NR, for a single SIM UE once a SRVCC call in UTRA has ended.

As illustrated, if the network redirects the UE to LTE (at 502) after the call end, the UE may synchronize with an LTE cell at 504.

In this case, if a SIB24 is broadcast is broadcast on the LTE cell (as determined at 506), the UE may read the SIB24 to scan for any suitable NR neighbors (at 508). If no suitable cells are found (at 510), or if SIB24 is not broadcast, the UE may camp on the LTE cell (at 514).

If a suitable NR cell is found, at 510, the UE may camp on the NR cell, at 512. This approach may result in a much faster return to NR as a result of the UE actively seeking information regarding NR neighbor cells (broadcast in LTE) after the end of the SRVCC call.

Figure 6:
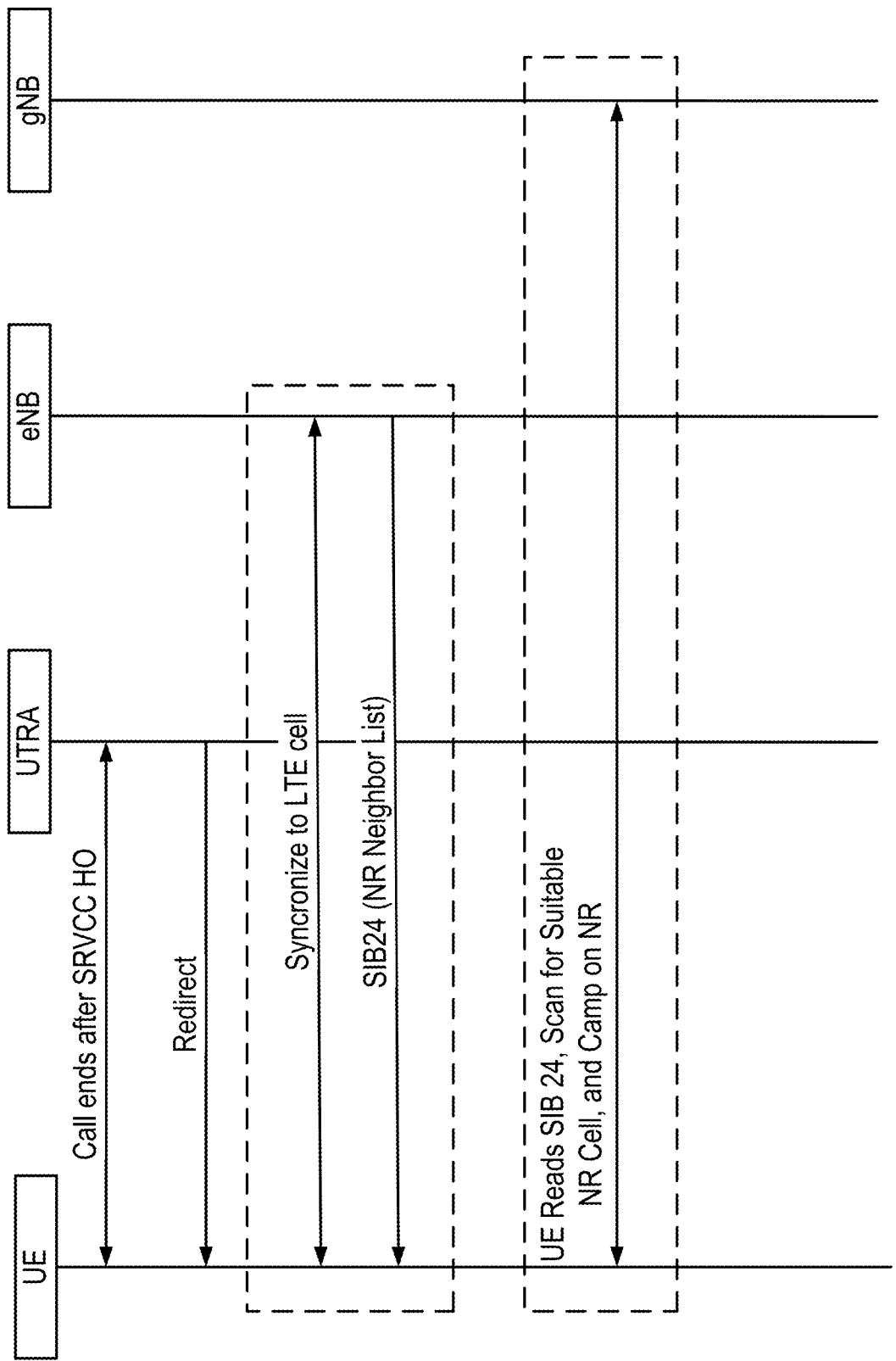
FIG. 6 depicts a call flow diagram for UE return to a first RAT after a call continuity procedure in a second RAT, in accordance with certain aspects of the present disclosure.

FIG. 6 illustrates a call flow diagram for this scenario, where the UE is redirected to LTE and is able to find a suitable NR cell to camp on based on SIB24 broadcast in LTE. As illustrated, after being redirected to LTE, the UE synchronizes to the LTE cell and reads the SIB24. In this example, the UE finds and camps on a suitable NR cell, based on the information obtained from SIB24.

Returning to FIG. 5, if NW does not redirect the UE to LTE after the call end, the UE may read SIB19 broadcast in UTRA (at 516) and search for a suitable LTE neighbor (at 518). If no suitable LTE neighbor is found (or if a SIB19 is not broadcast), the UE may stay on UTRA (at 522). This may indicate there are no LTE/NR cells in the current region of the UE.

On the other hand, if a suitable LTE neighbor is found, at 520, the UE may perform the same steps described above, as if redirected to LTE in the first place.

Figure 7:
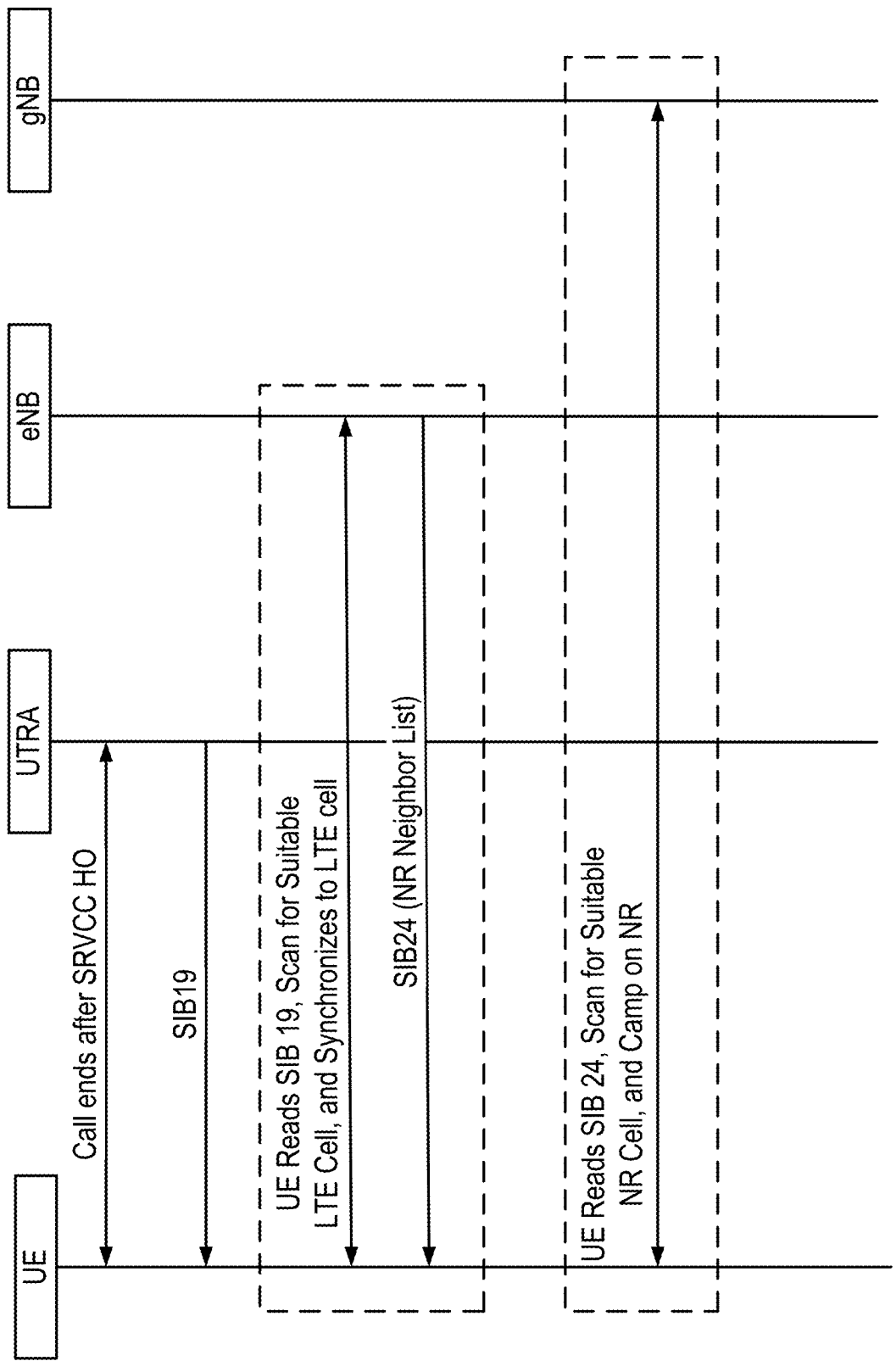
FIG. 7 depicts a call flow diagram for UE return to a first RAT after a call continuity procedure in a second RAT, in accordance with certain aspects of the present disclosure.

FIG. 7 illustrates a call flow diagram for this scenario, where the UE is not redirected to LTE, but is able to find a suitable LTE cell, based on information read from a SIB19 broadcast in UTRA. Once on LTE, the UE may find a suitable NR cell to camp on based on SIB24 broadcast in LTE, as in the example above.

In a conventional approach, without the mechanism proposed herein, a UE may perform a periodic NR full scan to check for any NR cells in the background when staying on a UTRA cell. Using the procedure described herein, on the other hand, the UE may return to NR much faster as a result of the UE actively seeking information regarding NR neighbor cells (broadcast in LTE) after the end of the SRVCC call.

Aspects of the present disclosure also provide mechanisms that may be used for a fast return for a multi-SIM UE (e.g., a dual SIM dual active (DSDA)), where multiple SIMs are active on same operator.

In such a multi-SIM scenario, there are various options for what RATs the UE SIMs are active on. For example, the UE could have two SIMS both active on NR (NR+NR) or could have one SIM active on NR and one SIM active on LTE (NR+LTE). The exact configuration could depend on device capability.

In the case of a multi-SIM scenario active with the same operator, both subscriber units (SUBs, e.g., SUB1 and SUB2) may be camped on the same cell. If operating on the same RAT and with DSDA, the SUBs will have independent RF resource.

In case of NR+NR, if one SUB moved to UTRA as part of SRVCC, after the SRVCC, the UE may camp back on the NR cell same as $2^{nd}$ SUB. It is possible that the $2^{nd}$ SUB (SUB2) might fallback to LTE, for example, due to a lack of coverage on NR. In that case, the $1^{st}$ SUB (SUB1) may also camp on LTE.

In the case of NR+LTE, if the NR SUB falls back to UTRA for SRVCC, then after the call ends, the UE (already active with the $2^{nd}$ SUB in LTE) may read SIB24 on the $2^{nd}$ SUB and use the NR cell information in that SIB to search and camp for a suitable NR cell. If SIB24 is not available or no suitable NR cell found even after scanning the cells in SIB24, then SUB1 may just camp on the sane LTE cell as SUB2.

As an alternatively, the $2^{nd}$ SUB could be moved to NR and the $1^{st}$ SUB could then be moved to LTE as part of redirection from NW, or as part of an absolute priority reselection (SIB19).

Aspects of the present disclosure also provide mechanisms that may be used for a fast return for a dual SIM dual standby (DSDS) scenario on the same operator. In this scenario, both of the SUBs (SUB1 and SUB2) may be camped on the same cell if operating on the same RAT and with DSDS, both SUBs may share the RF resource.

Once SUB1 moves to UTRA as part of SRVCC, SUB1 may be allocated the RF resource and SUB2 may move to "No Service" for some time.

Once the SRVCC call has ended, SUB1 could perform a procedure (e.g., described above) for a fast return to NR. SUB2 could then follow on and camp on the same cell/RAT as SUB1. This approach may help ensure that obtaining service on a suitable (e.g., best available) RAT would be achieved faster because if SUB2 initiated an out of service (OOS) scan, this might be more time/power consuming, particular if it ends up performing a full scan RAT-by-RAT until a suitable cell is found, while on SUB1, NW assistance might help it to find the cell faster.

Because SRVCC is typically performed due to poor/no coverage on NR, it is possible the UE might not find coverage on NR and if SUB2 initiates the OOS scan, it might start with NR which could be fairly time and/or power consuming.

For a Multi SIM UE on different operators, the UE may make decisions based on a packet switched (PS) call. It this case, if SUB1 moves to UTRA as part of SRVCC and if a PS call is supported on SUB2 (i.e., SUB2 is the default data SIM-DDS), then SUB1 may be allowed to stay on UTRA (or could be moved to LTE) if it does not support data (i.e., non-DDS).

In some cases, the UE could stay in UTRA (or LTE) until the next full scan is triggered or till NW manually redirects it to LTE (and may be then to NR). Such an approach may also save power with relatively small (if any) performance degradation, since the SUB is anyway not a DDS SUB and lower RAT has lower power consumption compared to higher RAT.

As in the cases described above, it may be preferred that a UE moves back to NR, for example, in a next scan because certain types of calls, such as voice over NR (VoNR) or voice over LTE (VoLTE) calls may be of better quality.

In some cases, when a user changes the preference of DDS when the new DDS SUB is in UTRA/LTE, the UE may quickly move to NR through the early return procedures described above.

Example Methods

FIG. 8 shows an example of a method 800 for wireless communications, in accordance with aspects of the present disclosure. In some aspects, a base station, such as the UE 104 of FIGS. 1 and 2, or processing system 902 of FIG. 9, may perform the operations of method 800.

At operation 810, the UE moves from a first radio access technology (RAT) to a second RAT to maintain continuity of a call. For example, the UE, while in a call established in NR, may move to UTRA to continue the call via an SRVCC procedure.

At operation 820, the UE takes one or more actions involving a third RAT to speed a return to the first RAT after the call has ended in the second RAT. For example, the UE may learn, from a SIB broadcast in LTE, one or more NR cells to camp on after the SRVCC procedure.

Example Wireless Communication Devices

Figure 9:
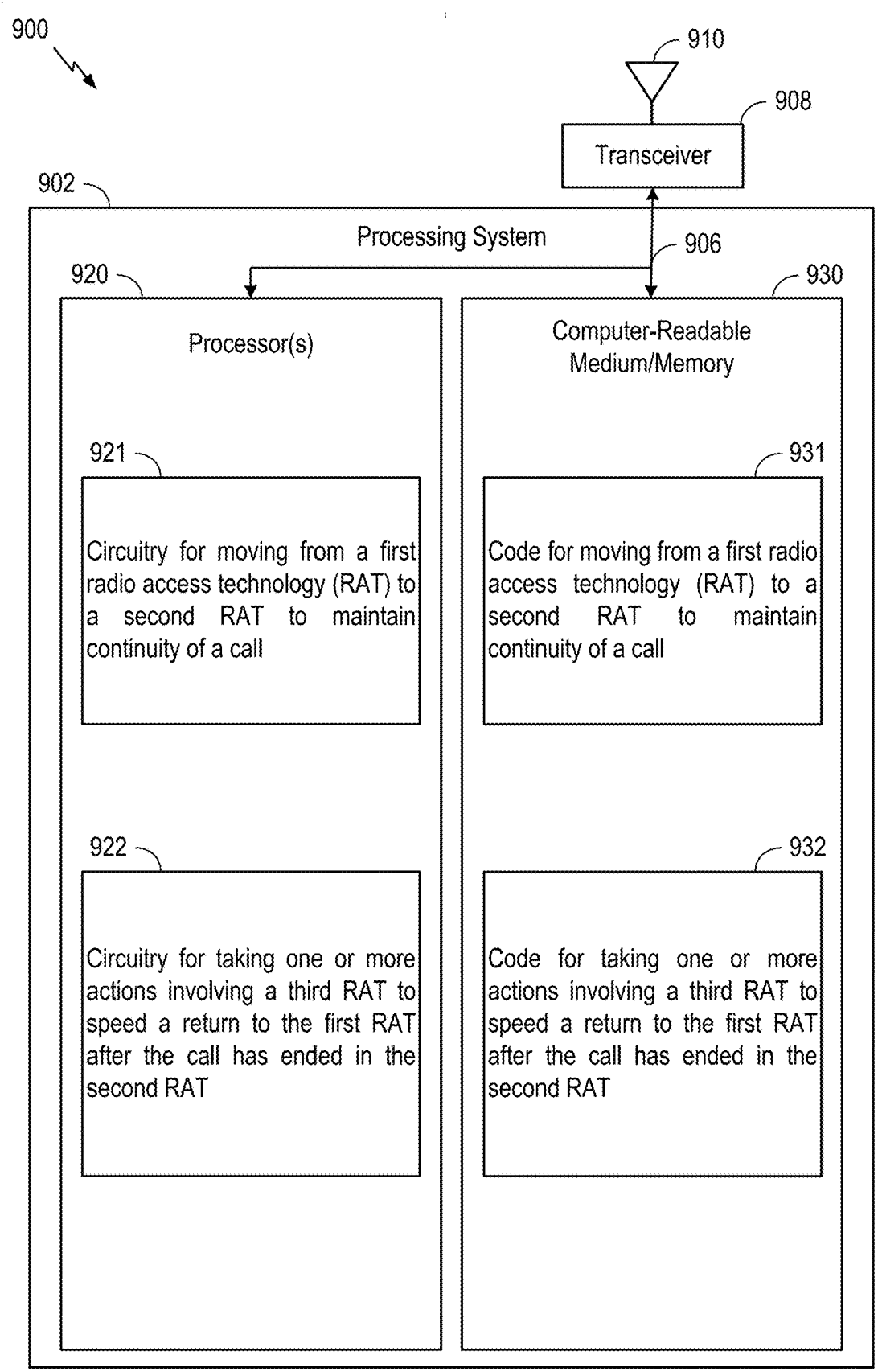
FIG. 9 depicts aspects of an example communications device, according to certain aspects of the present disclosure.

FIG. 9 depicts an example communications device 900 that includes various components operable, configured, or adapted to perform operations for the techniques disclosed herein, such as the operations depicted and described with respect to FIG. 8. In some examples, communication device 900 may be a user equipment (UE) 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 920 via a bus 906. In certain aspects, computer-readable medium/memory 920 is configured to store instructions (e.g., computer-executable code) that when executed by the one or more processors 920, cause the one or more processors 920 to perform the operations illustrated in FIG. 8, or other operations for performing the various techniques discussed herein.

In the depicted example, computer-readable medium/memory 930 stores code 931 for moving from a first radio access technology (RAT) to a second RAT to maintain continuity of a call; and code 932 for taking one or more actions involving a third RAT to speed a return to the first RAT after the call has ended in the second RAT.

In the depicted example, the one or more processors 920 include circuitry configured to implement the code stored in the computer-readable medium/memory 920, including circuitry 921 for moving from a first radio access technology (RAT) to a second RAT to maintain continuity of a call; and circuitry 922 for taking one or more actions involving a third RAT to speed a return to the first RAT after the call has ended in the second RAT. Various components of communications device 900 may provide means for performing the methods described herein, including with respect to FIG. 8.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for moving and/or means for taking may include various processing system components, such as: the one or more processors 920 in FIG. 9, or aspects of the UE 104 depicted in FIG. 2, including receive processor 258, transmit processor 264, TX MIMO processor 266, and/or controller/processor 280 (including EPS fallback component 281).

Notably, FIG. 9 is just use example, and many other examples and configurations of communication device 900 are possible.

Example Clauses

Implementation examples are described in the following numbered clauses:

Clause 1: A method for wireless communications by a user equipment (UE), comprising: moving from a first radio access technology (RAT) to a second RAT to maintain continuity of a call; and taking one or more actions involving a third RAT to speed a return to the first RAT after the call has ended in the second RAT.

Clause 2: The method of Clause 1, wherein the first RAT comprises new radio (NR), the second RAT comprises Universal Terrestrial Radio Access (UTRA), and the third RAT comprises long term evolution (LTE).

Clause 3: The method of any one of Clauses 1-2, wherein the one or more actions comprise: synchronizing with a cell of the third RAT; searching for system information on the cell of the third RAT to obtain information regarding one or more cells of the first RAT; and camping on one of the cells of the first RAT, if the system information is found and one of the cells of the first RAT is found suitable for camping on.

Clause 4: The method of Clause 3, further comprising camping on a cell of the third RAT if no suitable cell of the first RAT is found or the system information is not broadcast.

Clause 5: The method of Clause 3, further comprising receiving signaling redirecting the UE to the third RAT after the call has ended in the second RAT.

Clause 6: The method of Clause 3, further comprising, if the UE does not receive signaling redirecting the UE to the third RAT after the call has ended in the second RAT: searching for system information on a cell of the second RAT to obtain information regarding one or more cells of the third RAT to identify a suitable cell of the third RAT for the UE to synchronize with.

Clause 7: The method of Clause 3, further comprising: camping on a cell of the second RAT if no suitable cell of the third RAT is found; and performing a full scan for cells of the first RAT, while camped on the cell of the second RAT.

Clause 8: The method of Clause 3, wherein: the UE is operating in a multi subscriber identity module (SIM) mode with at least a first subscriber (SUB) associated with the call and a second SUB that is associated with a same operator as the first SUB and active on the third RAT; and the UE searches for the system information on the cell of the third RAT, via the second SUB, to obtain the information regarding one or more cells of the first RAT.

Clause 9: The method of Clause 3, wherein: the UE is operating in a multi subscriber identity module (SIM) mode with at least a first subscriber (SUB) associated with the call and a second SUB associated with a same operator as the first SUB; and the UE camps the second SUB on a same cell as the first SUB.

Clause 10: The method of Clause 3, wherein: the UE is operating in a multi subscriber identity module (SIM) mode with at least a first subscriber (SUB) associated with the call and a second SUB associated with a different operator than the first SUB.

Clause 11: The method of Clause 10, further comprising: after moving the first SUB to the second RAT, keeping the first SUB in the second RAT until a next scan of the first RAT is triggered or until the UE receives signaling directing the UE to the third RAT.

Clause 12: The method of Clause 10, further comprising: taking one or more actions to speed a return of at least one of the first SUB or second SUB to the first RAT after a user changes preference of a new designated data subscription (DDS) SUB when the new DDS SUB is in the second RAT or the third RATClause 1: A method for wireless communications by a user equipment (UE), comprising.

Clause 13: An apparatus, comprising: a memory comprising executable instructions; one or more processors configured to execute the executable instructions and cause the apparatus to perform a method in accordance with any one of Clauses 1-X.

Clause 14: An apparatus, comprising means for performing a method in accordance with any one of Clauses 1-12.

Clause 15: A non-transitory computer-readable medium comprising executable instructions that, when executed by one or more processors of an apparatus, cause the apparatus to perform a method in accordance with any one of Clauses 1-12.

Clause 16: A computer program product embodied on a computer-readable storage medium comprising code for performing a method in accordance with any one of Clauses 1-12.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and base station (BS) 102, next generation NodeB (gNB or gNodeB), access point (AP), distributed unit (DU), carrier, or transmission reception point may be used interchangeably. A BS 102 may provide communication coverage for a macro cell, a pico cell, a femto cell, and/or other types of cells.

A macro cell may generally cover a relatively large geographic area (e.g., several kilometers in radius) and may allow unrestricted access by user equipments (UEs) 104 with service subscription. A pico cell may cover a relatively small geographic area (e.g., a sports stadium) and may allow unrestricted access by UEs 104 with service subscription. A femto cell may cover a relatively small geographic area (e.g., a home) and may allow restricted access by UEs 104 having an association with the femto cell (e.g., UEs in a Closed Subscriber Group (CSG) and UEs 104 for users in the home). A BS 102 for a macro cell may be referred to as a macro BS. A BS 102 for a pico cell may be referred to as a pico BS. A BS 102 for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs 102, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink (DL) and uplink (UL) (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as R*x* for one particular configuration, where 100*x* is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of user equipment (UE) optimization in evolved packet system (EPS) fallback fast return procedure in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    moving from a first radio access technology (RAT) to a second RAT to maintain continuity of a call associated with a first subscriber of the UE; and
    taking one or more actions involving a third RAT to speed a return of the first subscriber to the first RAT after the call has ended in the second RAT, wherein a second subscriber of the UE moves to the first RAT based on the first subscriber returning to the first RAT.

2. The method of claim 1, wherein the first RAT comprises new radio (NR), the second RAT comprises Universal Terrestrial Radio Access (UTRA), and the third RAT comprises long term evolution (LTE).

3. The method of claim 1, wherein the one or more actions comprise:
    synchronizing with a cell of the third RAT;
    searching for system information on the cell of the third RAT to obtain information regarding one or more cells of the first RAT; and
    camping on one of the cells of the first RAT, if the system information is found and one of the cells of the first RAT is found suitable for camping on.

4. The method of claim 3, further comprising camping on a cell of the third RAT if no suitable cell of the first RAT is found or the system information is not broadcast.

5. The method of claim 3, further comprising receiving signaling redirecting the UE to the third RAT after the call has ended in the second RAT.

6. The method of claim 3, further comprising, if the UE does not receive signaling redirecting the UE to the third RAT after the call has ended in the second RAT:

searching for system information on a cell of the second RAT to obtain information regarding one or more cells of the third RAT to identify a suitable cell of the third RAT for the UE to synchronize with.

7. The method of claim 3, further comprising:
camping on a cell of the second RAT if no suitable cell of the third RAT is found; and
performing a full scan for cells of the first RAT, while camped on the cell of the second RAT.

8. The method of claim 3, wherein:
the UE is operating in a multi subscriber identity module (SIM) mode with at least the first subscriber associated with the call and the second subscriber that is associated with a same operator as the first subscriber and active on the third RAT; and
the UE searches for the system information on the cell of the third RAT, via the second subscriber, to obtain the information regarding one or more cells of the first RAT.

9. The method of claim 3, wherein:
the UE is operating in a multi subscriber identity module (SIM) mode with at least the first subscriber associated with the call and the second subscriber associated with a same operator as the first subscriber; and
the UE camps the second subscriber on a same cell as the first subscriber.

10. The method of claim 3, wherein:
the UE is operating in a multi subscriber identity module (SIM) mode with at least the first subscriber associated with the call and the second subscriber associated with a different operator than the first subscriber.

11. The method of claim 10, further comprising:
after moving the first subscriber to the second RAT, keeping the first subscriber in the second RAT until a next scan of the first RAT is triggered or until the UE receives signaling directing the UE to the third RAT.

12. The method of claim 10, further comprising:
taking one or more actions to speed a return of at least one of the first subscriber or second subscriber to the first RAT after a user changes preference of a new designated data subscription (DDS) subscriber when the new DDS subscriber is in the second RAT or the third RAT.

13. An apparatus for wireless communications by a user equipment (UE), comprising:
one or more processors coupled to memory, the one or more processors, individually or collectively, configured to:
move from a first radio access technology (RAT) to a second RAT to maintain continuity of a call associated with a first subscriber of the UE; and
take one or more actions involving a third RAT to speed a return of the first subscriber to the first RAT after the call has ended in the second RAT, wherein a second subscriber of the UE moves to the first RAT based on the first subscriber returning to the first RAT.

14. The apparatus of claim 13, wherein the first RAT comprises new radio (NR), the second RAT comprises Universal Terrestrial Radio Access (UTRA), and the third RAT comprises long term evolution (LTE).

15. The apparatus of claim 13, wherein the one or more actions comprise:
synchronizing with a cell of the third RAT;
searching for system information on the cell of the third RAT to obtain information regarding one or more cells of the first RAT; and
camping on one of the cells of the first RAT, if the system information is found and one of the cells of the first RAT is found suitable for camping on.

16. The apparatus of claim 15, wherein the one or more processors, individually or collectively, are further configured to camp on a cell of the third RAT if no suitable cell of the first RAT is found or the system information is not broadcast.

17. The apparatus of claim 15, wherein the one or more processors, individually or collectively, are further configured to receive signaling redirecting the UE to the third RAT after the call has ended in the second RAT.

18. The apparatus of claim 15, wherein the one or more processors, individually or collectively, are further configured to, if the UE does not receive signaling redirecting the UE to the third RAT after the call has ended in the second RAT:
search for system information on a cell of the second RAT to obtain information regarding one or more cells of the third RAT to identify a suitable cell of the third RAT for the UE to synchronize with.

19. The apparatus of claim 15, wherein the one or more processors, individually or collectively, are further configured to:
camp on a cell of the second RAT if no suitable cell of the third RAT is found; and
perform a full scan for cells of the first RAT, while camped on the cell of the second RAT.

20. The apparatus of claim 15, wherein:
the UE is operating in a multi subscriber identity module (SIM) mode with at least the first subscriber associated with the call and the second subscriber that is associated with a same operator as the first subscriber and active on the third RAT; and
the UE searches for the system information on the cell of the third RAT, via the second subscriber, to obtain the information regarding one or more cells of the first RAT.

21. The apparatus of claim 15, wherein:
the UE is operating in a multi subscriber identity module (SIM) mode with at least the first subscriber associated with the call and the second subscriber associated with a same operator as the first subscriber; and
the UE camps the second subscriber on a same cell as the first subscriber.

22. The apparatus of claim 15, wherein:
the UE is operating in a multi subscriber identity module (SIM) mode with at least the first subscriber associated with the call and the second subscriber associated with a different operator than the first subscriber.

23. The apparatus of claim 22, wherein the one or more processors, individually or collectively, are further configured to:
after moving the first subscriber to the second RAT, keep the first subscriber in the second RAT until a next scan of the first RAT is triggered or until the UE receives signaling directing the UE to the third RAT.

24. The apparatus of claim 22, wherein the one or more processors, individually or collectively, are further configured to:
take one or more actions to speed a return of at least one of the first subscriber or the second subscriber to the first RAT after a user changes preference of a new designated data subscription (DDS) subscriber when the new DDS subscriber is in the second RAT or the third RAT.

25. A non-transitory computer readable medium having instruction stored thereon for:
 moving from a first radio access technology (RAT) to a second RAT to maintain continuity of a call associated with a first subscriber of a user equipment (UE); and
 taking one or more actions involving a third RAT to speed a return of the first subscriber to the first RAT after the call has ended in the second RAT, wherein a second subscriber of the UE moves to the first RAT based on the first subscriber returning to the first RAT.

26. An apparatus for wireless communications by a user equipment (UE), comprising:
 means for moving from a first radio access technology (RAT) to a second RAT to maintain continuity of a call associated with a first subscriber of the UE; and
 means for taking one or more actions involving a third RAT to speed a return of the first subscriber to the first RAT after the call has ended in the second RAT, wherein a second subscriber of the UE moves to the first RAT based on the first subscriber returning to the first RAT.

* * * * *